United States Patent [19]
Akimoto

[11] Patent Number: 5,683,186
[45] Date of Patent: Nov. 4, 1997

[54] SEAL-CARRYING BEARING

[75] Inventor: Toshitaka Akimoto, Himeji, Japan

[73] Assignee: Nippon Thompson Co., Ltd., Tokyo, Japan

[21] Appl. No.: 671,624

[22] Filed: Jun. 28, 1996

[30] Foreign Application Priority Data

Jul. 14, 1995 [JP] Japan ................................. 7-200265

[51] Int. Cl.$^6$ .................................................. F16C 33/78
[52] U.S. Cl. .......................... 384/607; 384/484; 384/486
[58] Field of Search .................................... 384/484, 486, 384/607; 277/189, 152, 166, 186

[56] References Cited

U.S. PATENT DOCUMENTS

| | | | |
|---|---|---|---|
| 4,463,955 | 8/1984 | Delhaes | 277/166 |
| 5,385,352 | 1/1995 | Kurose | 277/152 |
| 5,470,158 | 11/1995 | McLarty et al. | 384/484 |

FOREIGN PATENT DOCUMENTS 1-307515  12/1989  Japan .

*Primary Examiner*—Lenard A. Footland
*Attorney, Agent, or Firm*—Browdy and Neimark

[57] ABSTRACT

In this seal-carrying bearing, seals are fitted removably in outer races. Owing to a resilient force occurring due to the elastic deformation of the seals fitted in annular grooves formed in the outer races, the seals are held in the annular grooves. Each of the seals comprises a core member fitted in the relative annular groove and formed by an elastic metal plate, and an elastic seal member fixed unitarily to the core member. The elastic seal member comprises a support portion fitted in the annular groove and held therein by a resilient force owing to elastic deformation occurring to the insertion thereof into the annular groove, a seal base portion closely contacting a circumferential surface of the relative outer race along the annular groove, and a seal lip portion extending from the seal base portion to a position in which the seal lip portion contacts the counter surface of the inner race.

8 Claims, 3 Drawing Sheets

SEAL-CARRYING BEARING

BACKGROUND OF THE INVENTION

1. Field of the Invention

This invention relates to a seal-carrying bearing provided with an outer race, an inner race, rolling elements rolling on a raceway between raceway surfaces of these two races, and seals for sealing clearances between these two races.

2. Description of the Prior Art

As shown in FIG. 7, a conventional cross roller bearing comprises an inner race 1 fixed to a shaft 20, such as a rotary shaft by a bolt 24 via a holding plate 22, an outer race 2 fixed to a bearing box 21 by a bolt 25 via a holding plate 23, and rollers 3 adapted to roll on a raceway 29 formed by a raceway surface 15 of the inner race 1 and that 16 of the outer race 2. The outer race 2 comprises two divisional races 2a, 2b, which have respective inclined raceway surfaces 16 forming an inverted V-shaped groove. The inner race 1 has a V-shaped groove formed by its inclined raceway surfaces 15. The V-shaped groove in the inner race 1 and the inverted V-shaped groove in the outer race 2 form a raceway 29. In this raceway 29, the rollers 3 are arranged crossways, i.e., in such a manner that the directions in which adjacent rollers 3 are disposed cross each other. Such a cross roller bearing can support a radial load and a two-way axial load. Seals 26 are provided in the surfaces of the divisional races 2a, 2b of the outer race 2 which are opposed to the inner race 1. The seals 26 are disposed so as to extend toward the opposed surfaces of the inner race 1. A lubricating oil is supplied from a grease nipple 26 to the raceway 29, on which the rollers 3 roll, through an oil passage 27 and a radial oil passage 35. This type of bearings include, for example, the bearing disclosed in Japanese Patent Laid-Open No. 307515/1989.

The known seal structures for sealing a clearance between an inner race and an outer race in a conventional cross roller bearing include a seal structure shown in FIGS. 5 and 6. Referring to these drawings, the parts equivalent to those shown in FIG. 7 are designated by the same reference numerals. The divisional races 2a, 2b of an outer race 2 are provided with annular grooves 4 (annular groove in the divisional race 2a only is shown) in the surfaces 13 thereof which are opposed to the inner race 1 so that the these grooves 4 extend in the circumferential direction. Each of the annular grooves 4 in the outer race 2 is provided therein with a seal 30 as a seal member for sealing a clearance S between the inner and outer races 1, 2. The seal 30, a cross-sectional view of which is shown in FIG. 5, comprises a support portion 31 fitted in the annular groove 4, a seal base portion 32 contacting the inner race-opposed surface 13 of the outer race 2, and a seal lip portion 33 extending so as to contact an outer race-opposed surface 14 of the inner race 1.

The seal 30 is manufactured, for example, in the following manner and fixed to the outer race 2. A cross roller bearing is usually formed to various sizes and a large diameter, and, therefore, an elongated rod type molded rubber seal member is used as a raw material for forming the seal 30. First, a rubber seal member is cut to a circumferential length of the annular groove formed in a cross roller bearing, and the cut surfaces at both end of the resultant rubber seal member are bonded to each other by using a bonding agent so as to obtain an annular seal 30, a so-called wound seal to be fitted in the annular groove 4. In order to firmly fit the annular seal 30 in the annular groove 4 in the outer race 2, a bonding agent is applied to the support portion 31 of the seal 30 or the inner surface of the annular groove 4, and the support portion 31 of the seal 30 is inserted into the annular groove 4, both of which are then bonded together.

However, in order to bond the seal 30 to the annular groove 4 formed in the outer race 2 (or inner race 1) in a cross roller bearing as mentioned above, it is necessary to carefully degrease the surface to be coated with a bonding agent, and then apply a bonding agent to the degreased surface. Therefore, the seal 30 cannot be fixed simply in the annular groove 4 in the outer race 2 (or inner race 1), i.e., the seal fixing operation requires much time. In the case where the outer race 2 (or inner race 1) and the seal 30 are fixed to each other by using a bonding agent, the seal 30 becomes liable to come off due to the deterioration with time of the bonding agent.

SUMMARY OF THE INVENTION

An object of the present invention is to provide a seal-carrying bearing capable of fixing seals simply and firmly, which are adapted to seal clearances between outer and inner races for the purpose of preventing the entry of dust thereinto, in annular grooves in the outer or inner race by utilizing a resilient force of the seals occurring due to the elastic deformation thereof without using a bonding agent, capable of fixing and removing seals simply during the replacement thereof, being free from deterioration with time of a seal bonding agent, and having a high durability.

This invention relates to a seal-carrying bearing having an inner race with raceway surfaces on the outer circumferential side thereof, an outer race with raceway surfaces on the inner circumferential side thereof at which the outer race is fitted around the inner race, seals adapted to seal clearances between opposed surfaces of the outer and inner races, and rolling elements adapted to roll on a raceway formed between the raceway surfaces, characterized in that circumferentially extending annular grooves are formed in counter surfaces of the outer or inner race so as to fit the seals therein, each of the seals comprising a core member fitted in the relative annular groove and formed by an elastic metal plate, and an elastic seal member fixed unitarily to the core member, the elastic seal member comprising a support portion fitted in the annular groove and held therein by a resilient force owing to elastic deformation occurring due to the insertion thereof into the annular groove, a seal base portion closely contacting a circumferential surface of the outer race along the annular groove, and a seal lip portion extending from the seal base portion to a position in which the seal lip portion contacts relative opposed surface of the inner race.

The support portion of the elastic seal member is provided on one side surface thereof with a projection extending so that the projection is compressively deformed when the support portion is fitted in the annular groove, the support portion being provided in the side surface thereof which is on the opposite side of the projection with a recess adapted to offset the elastic deformation of the projection.

Each of the annular grooves is formed to a cross-sectionally rectangular shape, and the width of the core member of each of the seals is set substantially equal to or smaller than that of the annular groove.

The core member of each seal is fixed to the elastic seal member by baking or by burying the former in the latter.

Either one of the inner and outer races comprises two annular divisional races separated along a plane perpendicular to an axis thereof.

The rolling elements comprise rollers, which are arranged so that the directions of disposition of alternate rollers cross each other.

In this seal-carrying bearing having the above-described construction, the core members of the seals are fitted in the annular grooves, in which the seals are held annularly owing to the elasticity of the core members. Owing to the elastic deformation of the support portions of the elastic seal member, a resilient force occurs, whereby the support portions are press fitted in the annular grooves firmly without using a bonding agent. Therefore, the seals are fixed in the annular grooves easily and do not substantially come off.

In this seal-carrying bearing, the seals are held resiliently in the annular grooves owing to the resilient force occurring due to the elastic deformation thereof, by forcibly inserting the seals in the annular grooves which are formed in the outer or inner race, so that the seals are fixed firmly in the outer or inner races without using a bonding agent. Since the seals are fixed in the outer or inner race without using a bonding agent, they can be removed simply from the annular grooves and renewed easily when the seals are damaged. This seal-carrying bearing enables the clearances between the opposed surfaces of the inner and outer races to be sealed completely by the seals, the passage of extraneous matter, such as water and dust through the clearances to be prevented, and the excellent sealing function of the seals to be maintained for a long period of time.

DESCRIPTION OF THE PREFERRED EMBODIMENTS

Figure 7:
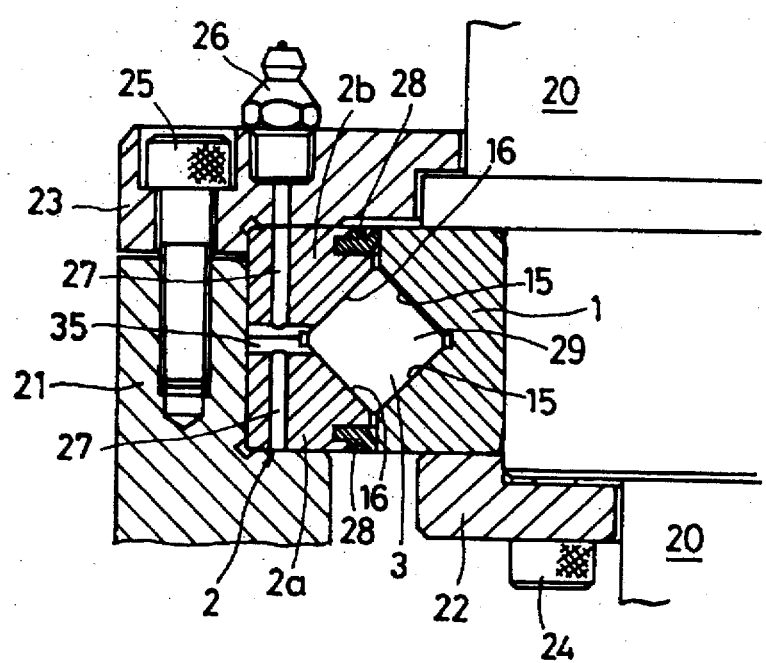
FIG. 7 is a sectional view of another conventional seal-carrying bearing.

The embodiments of the seal-carrying bearing according to the present invention will now be described with reference to the drawings. In the accompanying drawings, the parts identical with those shown in FIG. 7 are designated by the same reference numerals.

This seal-carrying bearing has a non-divided inner race 1 provided with V-shaped raceway surfaces 15 on the outer circumferential side thereof, and counter surfaces 14 on both sides (one side only is shown) of the raceway surfaces 15; an outer race 2 which is positioned on the outer circumferential side of the inner race 1 so that the outer and inner races 2, 1 are opposed to each other, and which is provided with inverted V-shaped raceway surfaces 16 and counter surfaces 13 on the inner circumferential side thereof; and a plurality of rollers 3 constituting rolling elements and adapted to roll on a raceway 29 formed between the raceway surfaces 15, 16. The outer race 2 is divided at the central portion thereof into two annular parts along a plane perpendicular to the axis thereof, i.e., comprises a pair of divisional races 2a, 2b. The divisional races 2a, 2b are provided on the axially inner sides thereof with inclined surfaces which form the inverted V-shaped raceway surfaces 16 opposed to the raceway surfaces 15, so as to form raceways 29 in cooperation with the V-shaped raceway surfaces 15 formed on the outer circumferential sides of the inner race 1. The rollers 3 are provided in the raceways 29 so that the directions of disposition of adjacent rollers cross each other, and adapted to roll on the raceways 29.

In this seal-carrying bearing, seals 5 are fixed so as to seal the clearances S between the counter surfaces 13, 14 of the outer and inner races 2, 1. The counter surfaces 13 (or 14) of the outer race 2 (or inner race 1) are provided with annular circumferentially extending cross-sectionally rectangular grooves 4 so as to fit the seals 5 therein, the seals 5 being fixed in the annular grooves 4. Each seal 5 comprises a core member 7 formed by an elastic metal plate, and an elastic seal member 6 fixed to the core member 7 to be unitary therewith. The elastic seal member 6 comprises a support portion 8 held in the annular groove 4 owing to a resilient force due to the elastic deformation thereof which occurs when the support portion is fitted in the annular groove 4, a seal base portion 9 having a surface closely contacting a circumferential surface (counter surface 13) along the annular groove 4, and a seal lip portion 10 extending from the seal base portion 9 to a position in which the seal lip portion contacts the counter surface 14 of the inner race 1.

The support portion 8 of each elastic seal member 6 is provided on one side surface thereof with a projection 11 extending so that the projection is compressively deformed when the support member 8 is fitted in the relative annular groove 4, and in the other side surface thereof with a recess 12 adapted to offset the elastic deformation of the projection 11. Before the seal 5 is inserted into the annular groove 4, the projection 11 provided on the support portion 8 is in a projecting state with respect to the annular groove 4, and, when the seal 5 is inserted forcibly into the annular groove 4, the projection 11 is compressed and elastically deformed toward the recess 12, whereby a resilient force occurs in the support portion 8.

The seal lip portion 10 of the elastic seal member 6 fixed in the annular groove 4 in the outer race 2 closely contacts the counter surface 14 of the inner race 1. The seal lip portion 10 may be pressed against the counter surface 14 to such an extent that the seal lip portion is deformed elastically to a slight degree but the level of this pressing force is, of course, regulated so that the frictional resistance does not increase, the seal 5 completely sealing the clearance S formed between the inner and outer races 1, 2. The width of the core member 7 of the seal 5 is set substantially equal to or smaller than that of the annular groove 4 so that the seal 5 can be inserted easily into the annular groove 4. The core member 7 of the seal 5 is fixed to an outer circumferential surface 17 of the support portion 8 of the elastic seal member 6 by baking.

The core member 7 is formed to the shape of a thin plate out of an elastic metal material having a resilient force, such as stainless steel and tool steel (SK material). The elastic seal member 6 is usually formed out of NBR (nitrile butadiene rubber, and it can also be formed out of some other material, such as an elastic material having a resilient force including urethane rubber. The seal 5 comprises a rod type molded product. It is a wound seal made by cutting this molded product before the seal is fitted in the annular groove 4 in the outer race 2 to a length suitable for fitting the resultant product in the annular groove 4, and then applying a bonding agent to both end surfaces of the cut product and joining the same surfaces to each other so as to obtain an annular body. This wound seal can be fixed in the annular groove 4 by press fitting.

Figure 1:
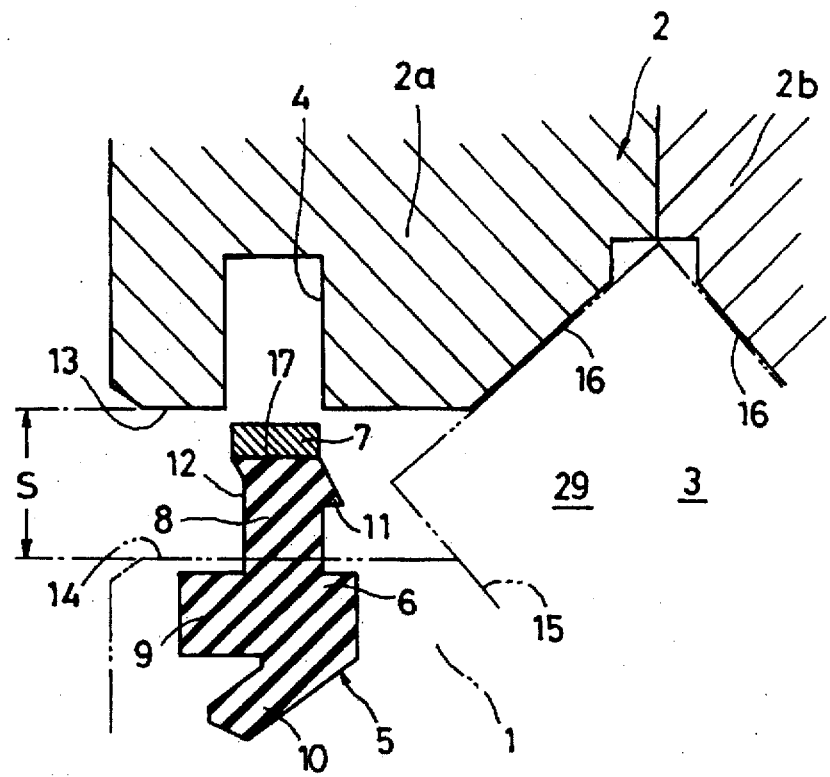
FIG. 1 is an exploded sectional view of an embodiment of the seal-carrying bearing according to the present invention.
Figure 2:
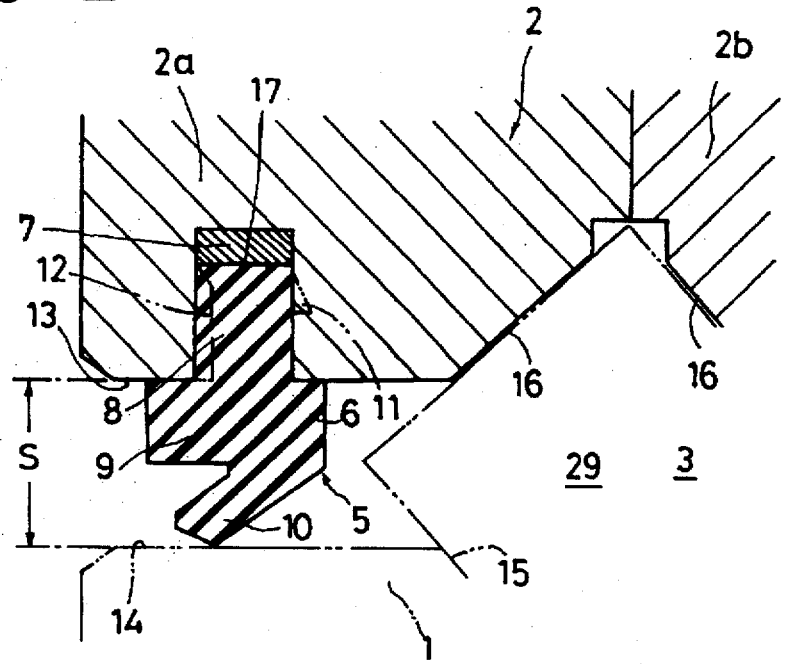
FIG. 2 is a sectional view showing the condition of a seal fixed in an outer race in the seal-carrying bearing of FIG. 1.
Figure 3:
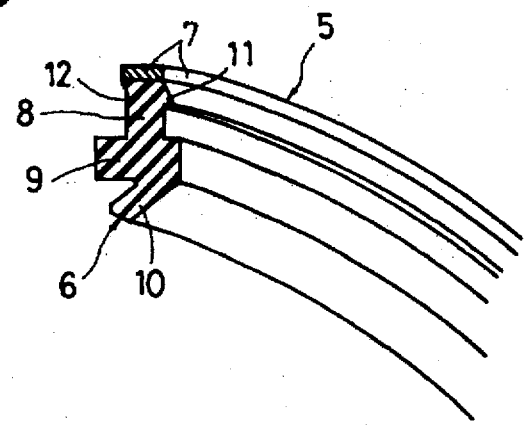
FIG. 3 is a partially sectioned perspective view showing an example of a seal incorporated in the seal-carrying bearing of FIG. 1.
Figure 4:
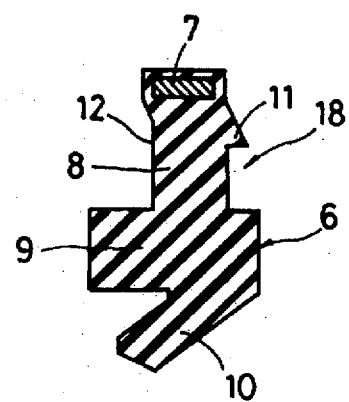
FIG. 4 is a sectional view of another example of a seal incorporated in the seal-carrying bearing of FIG. 1.
Figure 5:
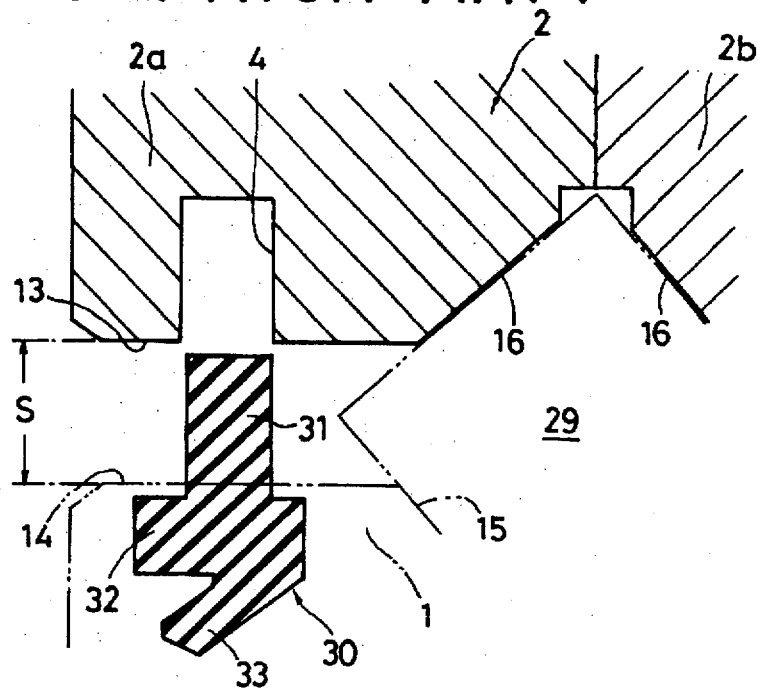
FIG. 5 is a sectional view of a conventional seal-carrying bearing.
Figure 6:
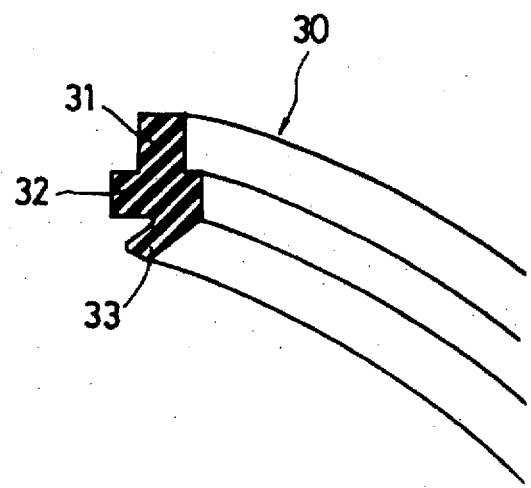
FIG. 6 is a partially sectioned perspective view showing an example of a seal incorporated in the seal-carrying bearing of FIG. 5.

Another embodiment of the seal-carrying bearing according to the present invention will now be described with reference to FIG. 4. The seal 18 in this embodiment has the same construction and operation as the seal 5 in the previously-described embodiment except that a core member 7 is fixed by being buried in an elastic seal member 6. The core member 7 is buried in an end part of a support portion 8 of the elastic seal member 6. When the seal 18 is fixed in an annular groove 4, the core member 7 takes an annular form due to its resilient operation in the annular groove 4 to hold the seal 18 in the annular groove 4.

As described above, these embodiments of seal-carrying bearings comprise bearings provided with a non-divided inner race 1, and an outer race 2 having divisional races 2a, 2b but the present invention is not limited to such a structure. The present invention can also employ an interchanged structure, i.e. a structure having a non-divided outer race 2 and a divided inner race. Although the outer race 2 is divided into divisional races 2a, 2b, in which annular grooves 4 are formed, the present invention is not limited to this structure, i.e., an interchanged structure (not shown) can also be employed in which annular grooves are formed in an inner race 1 with seals fixed therein. In such seal-carrying bearings, the construction of the inner and outer races are merely interchanged, and, since such bearings have substantially the same function as the cross roller bearings described in the above embodiments, the description of the function of the former bearings is omitted.

What is claimed is:

1. A seal-carrying bearing comprising an inner race having an inner raceway surface on an outer circumferential side thereof;

an outer race having an outer raceway surface on an inner circumferential side thereof, said outer race being fitted around said inner race;

at least one seal adapted to seal a clearance between respective counter surfaces of the outer and inner races;

rolling elements adapted to roll on a raceway formed between said inner and outer raceway surfaces;

a circumferentially extending annular groove, formed in either of said counter surfaces, comprising means to fit said seal therein;

said seal including a core member fitted in said annular groove and comprising an elastic metal plate, and an elastic seal member fixed unitarily to said core member;

and said elastic seal member including a support portion fitted in said annular grooves and held therein by a resilient force owing to an elastic deformation of said support portion occurring due to insertion thereof into said annular groove, a seal base portion closely contacting a circumferential surface adjacent said annular groove, and a seal lip portion extending from said seal base portion to positions in which said seal lip portion contact one of said counter surfaces;

said support portion of said elastic seal member including an extending projection, on a first side surface of said support portion, comprising means for said projection to be compressively deformed when said support portion is fitted in said annular groove, and a recess, on a second side surface of said support portion opposite said projection, comprising means to offset an elastic deformation of said projection.

2. The seal-carrying bearing according to claim 1, wherein said annular groove includes a rectangular cross-sectional shape and a groove width equal to or greater than a core member width of said core member.

3. The seal-carrying bearing according to claim 2, wherein said rectangular cross-sectional shape includes a bottom and said core member is adjacent said bottom.

4. The seal-carrying bearing according to claim 1, wherein said core member is fixed to said elastic seal member by baking.

5. The seal-carrying bearing according to claim 1, wherein one of the inner and outer races comprises two annular divisional races separated along a plane perpendicular to an axis thereof.

6. The seal-carrying bearing according to claim 1, wherein said rolling elements comprise rollers arranged such that rolling axes of alternate rollers cross each other.

7. The seal-carrying bearing according to claim 6, wherein the circumferential surface of the core member is substantially cylindrical.

8. The seal-carrying bearing according to claim 1, wherein the elastic seal member is fixed to a circumferential surface of the core member.

* * * * *